(12) United States Patent
Riedlinger et al.

(10) Patent No.: US 8,423,832 B2
(45) Date of Patent: Apr. 16, 2013

(54) SYSTEM AND METHOD FOR PREVENTING PROCESSOR ERRORS

(75) Inventors: Reid J. Riedlinger, Fort Collins, CO (US); Douglas John Cutter, Fort Collins, CO (US); Rich McGowen, II, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1656 days.

(21) Appl. No.: 11/593,841

(22) Filed: Nov. 7, 2006

(65) Prior Publication Data
US 2008/0126826 A1   May 29, 2008

(51) Int. Cl.
G06F 11/00   (2006.01)

(52) U.S. Cl.
USPC .............. 714/37; 714/24; 714/25; 714/30; 714/36; 710/260; 713/100

(58) Field of Classification Search .............. 714/24, 714/36, 25, 30, 47; 710/260; 713/100
See application file for complete search history.

(56) References Cited

U.S. PATENT DOCUMENTS

| | | | |
|---|---|---|---|
| 4,542,453 A | 9/1985 | Patrick et al. | |
| 4,751,703 A | 6/1988 | Picon et al. | |
| 5,513,346 A | 4/1996 | Satagopan et al. | |
| 5,561,774 A | 10/1996 | Aikawa et al. | |
| 5,574,872 A | 11/1996 | Rotem et al. | |
| 5,600,766 A * | 2/1997 | Deckys et al. | 345/641 |
| 5,838,578 A | 11/1998 | Pippin | |
| 5,901,225 A | 5/1999 | Ireton et al. | |
| 5,906,315 A * | 5/1999 | Lewis et al. | 236/49.3 |
| 5,920,264 A * | 7/1999 | Kim et al. | 340/584 |
| 5,983,000 A | 11/1999 | Perron | |
| 5,996,072 A * | 11/1999 | Noll et al. | 713/1 |
| 6,012,141 A | 1/2000 | Isaman | |
| 6,052,777 A | 4/2000 | Panwar | |
| 6,101,610 A * | 8/2000 | Beebe et al. | 713/323 |
| 6,131,158 A | 10/2000 | Matsuo et al. | |
| 6,172,611 B1 * | 1/2001 | Hussain et al. | 340/584 |
| 6,363,490 B1 | 3/2002 | Senyk | |
| 6,412,081 B1 | 6/2002 | Koscal et al. | |
| 6,615,366 B1 | 9/2003 | Grochowski et al. | |
| 6,711,642 B2 | 3/2004 | Huang | |
| 6,804,632 B2 * | 10/2004 | Orenstien et al. | 702/188 |
| 6,823,240 B2 | 11/2004 | Cooper | |
| 6,823,516 B1 | 11/2004 | Cooper | |
| 2003/0074591 A1 * | 4/2003 | McClendon et al. | 713/322 |
| 2003/0163765 A1 * | 8/2003 | Eckardt et al. | 714/36 |
| 2005/0132177 A1 * | 6/2005 | Challener et al. | 713/1 |
| 2006/0143515 A1 * | 6/2006 | Kuramkote et al. | 714/15 |
| 2007/0005860 A1 * | 1/2007 | Lu et al. | 710/260 |

OTHER PUBLICATIONS

Intel, "Power and Thermal management in teh intel Core duo processor" May 2006.*
U.S. Appl. No. 11/529,145 entitled, "System and Method for Adjusting Operating Points of a Processor based on Detected Processor Errors," filed Sep. 28, 2006.

* cited by examiner

Primary Examiner — Scott Baderman
Assistant Examiner — Jeison C Arcos

(57) ABSTRACT

A system for preventing processor errors in accordance with one exemplary embodiment of the present disclosure has a processor core, a patch, and a controller. The patch configures the processor core to detect occurrences of an event indicative of an imminent error in the processor core. The controller is configured to adjust, in response to a detection of an occurrence of the event by the processor core, a clock signal or a power signal provided to the processor core such that the imminent error is prevented.

20 Claims, 3 Drawing Sheets

SYSTEM AND METHOD FOR PREVENTING PROCESSOR ERRORS

BACKGROUND

Computer systems have one or more processors that manipulate and control the flow of data by executing instructions. To provide more powerful computer systems, processor designers strive to continually increase the operating speed or frequency of the processor. As processor speed increases, the power consumed by the processor tends to increase as well resulting in higher temperatures within the processor. Moreover, increases in processor frequency and temperature can result in unreliable performance and cause errors to occur within the processor. Various techniques have been developed in an effort to optimally control processor temperature and frequency.

For example, some processors include an on-chip controller that adjusts the power supplied to the processor and the operating frequency of the processor based on a measured temperature of the processor. Thus, the processor can run at a higher operating frequency and, if the processor begins to overheat, the controller can reduce the processor's power and frequency until the processor's temperature falls back into a normal operating range. Therefore, the processor can achieve better performance during periods when its temperature is relatively low yet avoid at least some heat-related errors by throttling back power and frequency when the temperature increases above specified thresholds.

Moreover, the operating temperature and frequency of a processor can change while the processor is running. To ensure robustness, extensive testing of the processor is required. For example, before a processor manufacturer releases a product to consumers, the manufacturer usually tests the processor at many different operating points to ensure that it operates correctly at the different operating points. As used herein, an "operating point" of a processor is defined by an operating frequency and temperature. Thus, if a processor is tested multiple times at the same operating point, then the processor's operating frequency and temperature are the same for each of the tests. However, if a processor is tested at different operating points for each of a set of tests, then the processor has a different operating temperature or frequency for each of the tests.

Despite rigorous testing performed on current processors, it is not feasible to test a processor at all possible operating points for all possible conditions. Moreover, when a processor is shipped to consumers, it is likely that the processor has some bugs that can cause errors under certain conditions. When such a bug is identified, the design of the processor can be altered to compensate for or eliminate the identified bug so that future processors will not generate errors due to the same bug. Unfortunately, processors already manufactured prior to the design change are susceptible to errors caused by the bug.

Under certain circumstances, some bugs in previously manufactured processors can be corrected by implementing firmware or software updates, commonly referred to as "patches." However, depending on the type of bug at issue and the architecture of an affected processor, remedying some bugs via a patch can be difficult and problematic. If a processor designer is unable to remedy an identified bug via implementation of a patch or otherwise, then the processor can be replaced or, alternatively, allowed to continue operation without remedying the identified bug. Replacing processors having an identified bug can be expensive and burdensome for processor manufacturers, and allowing a processor to continue operation without remedying an identified bug may result in operational errors thereby adversely impacting processor performance.

Moreover, better techniques for remedying identified processor bugs are generally desirable so that potential processor errors can be prevented at a relatively low cost.

SUMMARY OF THE DISCLOSURE

The present disclosure generally pertains to systems and methods for preventing processor errors.

A system in accordance with one embodiment of the present disclosure comprises a processor core and a controller. The processor core is configured to perform an architectural break in response to a detection of an event indicative of an imminent error in the processor core. The controller is configured to adjust, in response to the detection, a clock signal or a power signal provided to the processor core during the architectural break such that the imminent error is prevented.

A system in accordance with another embodiment of the present disclosure comprises a processor core, a patch, and a controller. The patch configures the processor core to detect occurrences of an event indicative of an imminent error in the processor core. The controller is configured to adjust, in response to a detection of an occurrence of the event by the processor core, a clock signal or a power signal provided to the processor core such that the imminent error is prevented.

A method in accordance with one embodiment of the present disclosure comprises executing instructions from a computer program via a processor core, and detecting an occurrence of an event indicative of an imminent error in the processor core. The method also comprises interrupting the executing in response to the detecting, and adjusting, in response to the detecting, a clock signal or a power signal provided to the processor core such that the imminent error is prevented.

A method in accordance with another embodiment of the present disclosure comprises defining at least one condition indicative of an imminent error in a processor core, and downloading a patch in a computer system having the processor core. The method also comprises configuring, via the patch, the processor core to detect when the at least one condition is present in the processor core, and adjusting, based on the sensed temperature and in response to a detection of the at least one condition by the processor core, a clock signal or a power signal provided to the processor core such that an imminent error in the processor core is prevented.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for preventing processor errors. A system in accordance with an exemplary embodiment of the present disclosure comprises a processor having a core for executing instructions of computer programs. Further, an on-chip controller controls the operating temperature and/or frequency of the processor. The controller is "on-chip" in the sense that it is packaged on the same integrated circuit (IC) chip as the processor. Thus, the processor and the on-chip controller are integrated on a common substrate within the same package.

During normal operation, the controller adjusts a power signal and a clock signal provided to the processor core. In this regard, the controller determines the operating temperature of the processor core based on a temperature sensing device within the processor package and provides control signals to a power source and a clock that are both internal to the computer system in which the processor resides. Based on the control signals, the power source and the clock respectively adjust the power and clock signals provided to the processor core such that the operating temperature and frequency of the processor core remain within a desired range.

Certain processor bugs may occur only when the processor is operating at certain operating points. When such a bug is identified, the processor core can be reconfigured to detect conditions indicating when a possible error resulting from the bug is imminent. Such a reconfiguration may be achieved via implementation of a patch or otherwise. In response to a detection of a possible imminent error, the controller adjusts the processor core's frequency and/or power such that the processor core operates at a new operating point that will prevent the error from occurring. Such techniques for preventing an error from the identified bug can be implemented at a relatively low cost and without significant adverse impact to processor performance.

Figure 1:
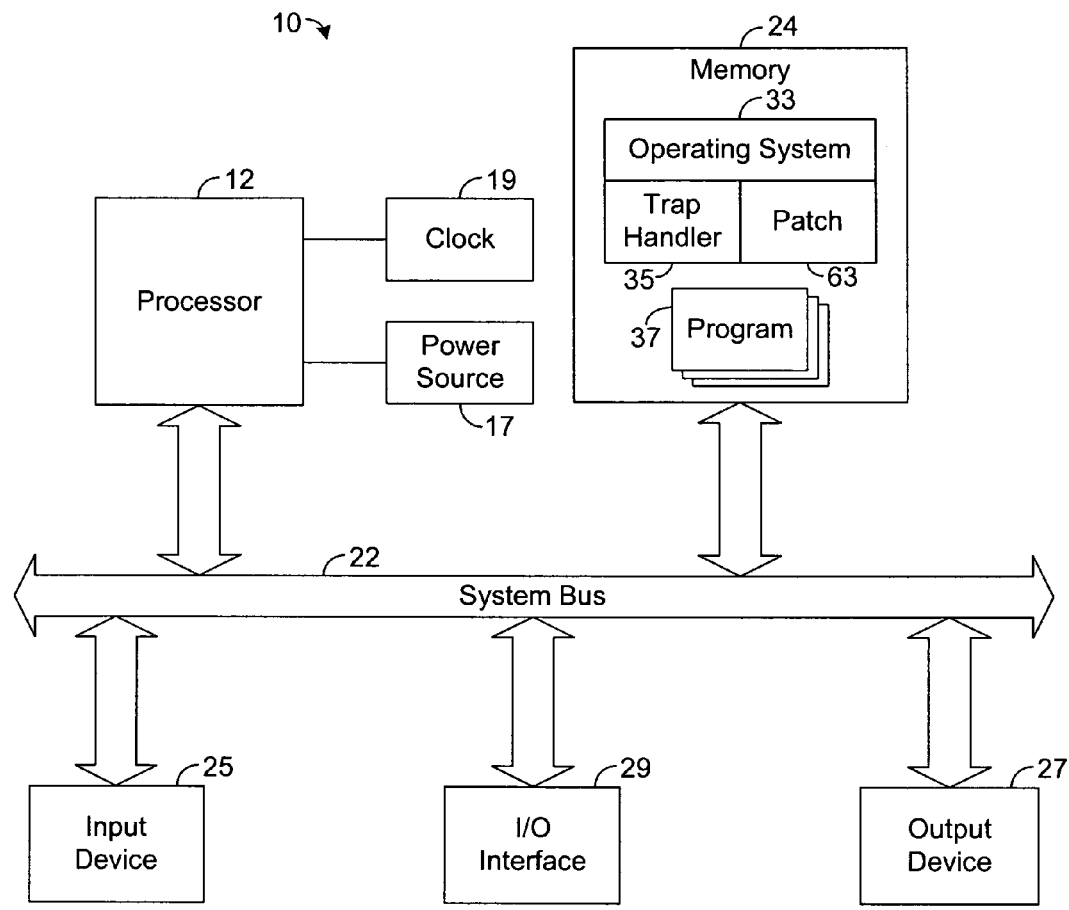
FIG. 1 is a block diagram illustrating a computer system in accordance with one exemplary embodiment of the present disclosure.

FIG. 1 depicts a computer system 10 in accordance with an exemplary embodiment of the present disclosure. As shown by FIG. 1, the system 10 comprises at least one processor 12 for executing instructions of computer code that may be stored in the system 10. The processor 12 is coupled to and receives a power signal from a power source 17. Also, the processor 12 is coupled to and receives a clock signal from a clock 19. The power signal from the power source 17 and the clock signal from the clock 19 control the operating temperature and frequency of the processor 12.

The system 10 of FIG. 1 also comprises a system bus 22 over which the processor 12 communicates with memory 24 external to the processor 12 and other system components, such as an input device 25, an output device 27, and an I/O interface 29. The input device 25, for example, a keyboard or a mouse, can be used to input data from a user of the system 10, and the output device 27, for example, a printer or monitor, can be used to output data to the user. The I/O interface 29 can comprise various known or future-developed interfaces (e.g., a universal serial bus (USB) port) that enable communication with external devices.

In addition, the system 10 comprises an operating system 33 for controlling the resources of the system 10 in accordance with techniques similar to those implemented by conventional operating systems, such as Microsoft Windows®. The operating system 33 may be implemented in hardware, software, firmware, or any combination thereof. In one embodiment, the operating system 33 is implemented in firmware and stored in read-only memory (ROM).

The system 10 of FIG. 1 also comprises a trap handler 35, which may be implemented in hardware, software, firmware, or any combination thereof. The trap handler 35 is invoked by the operating system 33 upon the detection of a specific event, referred to as a "trap." For example, the trap handler 35 may be invoked upon detection of a specific trap that is likely to result in an operational error, and the trap handler 35 may then handle the trap such that the error does not occur. An exemplary operation of the trap handler 35 will be described in more detail hereinbelow. In one embodiment, the trap handler 35 is implemented in firmware along with the operating system 33 and stored in ROM. However, other configurations of the trap handler 35 are possible.

Figure 2:
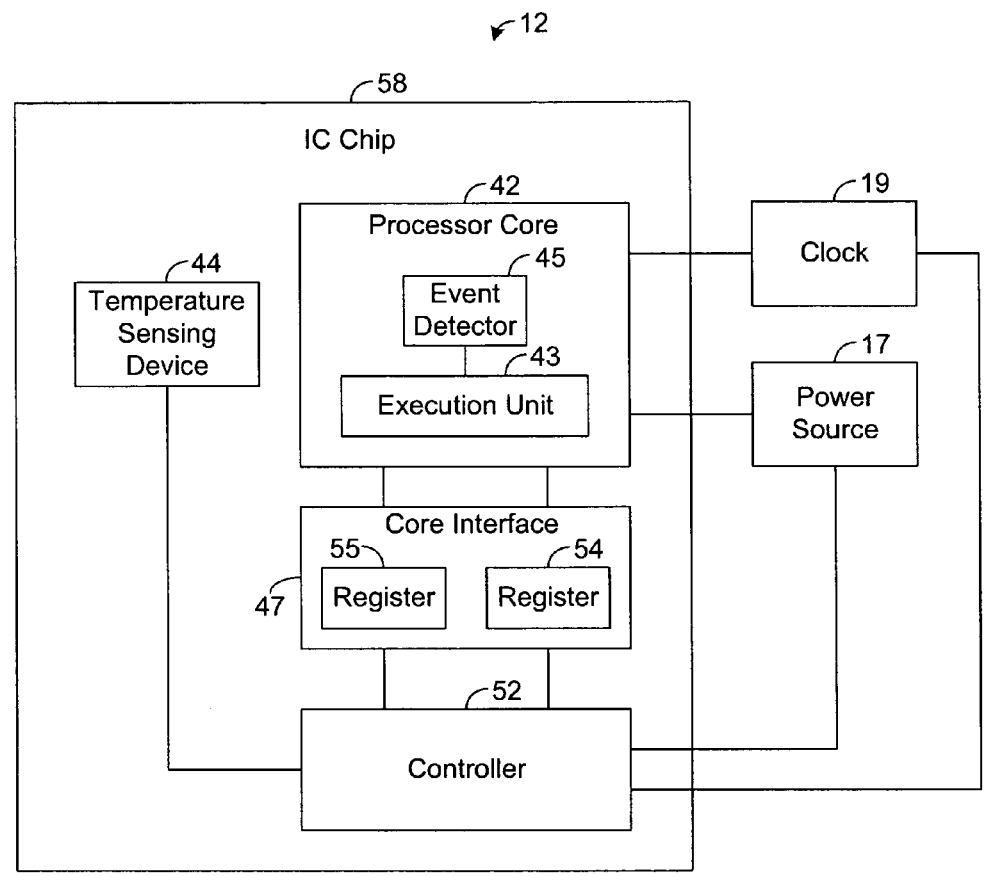
FIG. 2 is a block diagram illustrating an exemplary processor, such as is depicted in FIG. 1.

FIG. 2 depicts a more detailed view of the processor 12. As shown by FIG. 2, the processor 12 comprises a processor core 42 for executing instructions. In this regard, the core 42 comprises at least one execution unit 43 that executes instructions from at least one computer program 37 (FIG. 1) stored in memory 24. Each execution unit 43 comprises circuitry (not specifically shown), such as one or more pipelines, that execute instructions in various stages in accordance with many conventional processor cores. As shown by FIG. 2, the processor 12 also comprises a temperature sensing device 44, which can be used to determine an approximate operating temperature of the processor core 42. In one embodiment, the temperature sensing device 44 is a diode, although other types of temperature sensing devices may be used in other embodiments.

In addition, the processor 12 comprises an event detector 45 that is configured to detect various events in the processor 12 and to notify other resources in the system 10 of such events. Depending on the event detected, the event detector 45 may be configured to initiate a processor interrupt, commonly referred to as an "architectural break" or an "arch break," in response to detection of the event. In an arch break, normal execution of instructions, such as instructions from a program 37, by the execution unit 43 is temporarily halted. For example, detection of a particular event may indicate that a possible operational error within the processor 12 is imminent. Upon detection of the event, the event detector 45 may induce an arch break to completely stop execution by the execution unit 43 and then inform the operating system 33 of the detected event via a function call to the operating system 33. The operating system 33 may then invoke the trap handler 35; which then takes action to prevent an occurrence of the possible error before normal execution by the execution unit 43 is resumed. Thus, the operational error is prevented from occurring.

Note that the event detector 45 may be implemented in hardware, software, firmware, or a combination thereof. Further, although the event detector 45 is shown as implemented within the core 42, it is possible for at least portions of the event detector 45 to be located external to the core 42.

The processor core 42 is electrically coupled to a core interface 47 that provides a communication interface between the processor core 42 and a controller 52. In this regard, the core interface 47 comprises a core output register 54 that buffers data transmitted from the processor core 42 and a core input register 55 that buffers data transmitted from the controller 52. The controller 52 can be implemented in hardware, software, firmware, or a combination thereof. In one embodiment, the controller 52 comprises a microprocessor that fits in the same IC package as the processor core 42 and core interface 47. However, other types of components may be used to implement the controller 52 in other embodiments. Further, it is possible for the controller 52 to be located external to the IC package of the processor core 42.

The controller 52 is electrically coupled to the temperature sensing device 44, the power source 17, and the clock 19. By transmitting control signals to the power source 17 and the clock 19, the controller 52 is able to adjust the power signal and the clock signal provided to the processor core 42. During normal operation, the controller 52 detects the operating temperature of the processor core 42 based on the temperature sensing device 44 and adjusts the power and clock signal provided to the processor core 42 in order to keep the operating temperature and frequency of the core 42 within a desired range.

For example, if the operating temperature of the core 42 exceeds a specified upper threshold, the controller 52 may reduce the voltage of the power signal and/or the frequency of the clock signal in an effort to reduce the core's operating temperature. If, on the other hand, the operating temperature falls below a specified lower threshold, the controller 52 may increase the voltage of the power signal and/or the frequency of the clock signal in an effort to increase the core's performance. U.S. Pat. No. 6,363,490, entitled "Method and Apparatus for Monitoring the Temperature of a Processor," and filed on Mar. 30, 1999, which is incorporated herein by reference, describes exemplary techniques that may be used to control the operating temperature and frequency of the core 42. Further, it is possible for the processor 12 to have additional cores (not shown) to increase the performance of the processor 12.

As shown by FIG. 2, the processor core 42, core interface 47, and controller 52 are preferably packaged together and integrated on a single IC chip 58. The power source 17 and clock 19 may be coupled to I/O pins (not shown) of the IC chip 58, and may reside on the same printed circuit board (PCB) as the IC chip 58. However, in other embodiments, the power source 17 and clock 19 may reside on one more separate PCBs that are interfaced with the PCB of the IC chip 58. In addition, it is possible for various on-chip components, such as the controller 52 and the event detector 45, to be located external from the chip 58 in other embodiments.

Before the processor 12 is manufactured, its design can be rigorously tested to identify and eliminate as many bugs as is reasonably possible. However, it is likely that the processor 12 will have at least some undetected or unrecognized electrical bugs when it is ultimately manufactured, and these bugs may be the source of various operational errors. After manufacturing, one or more of the electrical bugs in the processor 58 may be eventually identified. It is possible for some such bugs to generate operational errors only when the processor core 42 is in certain operational states. For example, it may be discovered that, if the execution unit 43 executes a certain number, n, of add instructions consecutively while the processor core 42 is operating within a certain range of operating points, execution of the last add instruction (i.e., add instruction number n) will result in an error. Such an error may rarely occur since the processor core 42 must be within a finite range of operating points for the error to occur. For such bugs, it may not be cost feasible for a manufacturer of the processor 12 to replace previously distributed processors 12 with newly designed processors that are not susceptible to the bug.

In accordance with the present disclosure, an electrical bug that depends on the operating range of the processor core 42 may be remedied by updating the configuration of the processor core 42 to control its operating range such that the bug does not result in an operational error. In particular, the processor core 42 is preferably reconfigured so that it can detect when an error from the bug is imminent. Upon such detecting, the controller 52 adjusts the operating temperature and/or frequency of the processor core 42 such that it begins to operate at a safe operating point (i.e., an operating point that will prevent the bug from producing an error) until the threat imposed by the bug has subsided. Exemplary techniques for reconfiguring the processor 12 to prevent errors due to a previously identified electrical bug within the processor 12 will be described in more detail hereafter.

Once a bug dependent on the operating point of the processor core 42 has been identified, a processor designer preferably analyzes or tests the design of the processor core 42 in view of the bug to determine a safe operating range for the processor core 42. The "safe operating range" refers to a range of operating points for which the bug is not likely to cause an error if the processor core 42 is operating at an operating point within such range. The processor designer then creates a patch 63 (FIG. 1) that, when implemented in the system 10, causes the processor 12 to operate in the safe operating range in response to a detection that a possible error from the bug is imminent. The patch 63 can be implemented in hardware, software, firmware, or any combination thereof. In one embodiment, the patch 63 is implemented in software or firmware and is stored within memory 24.

The patch 63 is configured to cause an arch break to occur upon a detection of an event indicative of a possible imminent error due to the identified bug. In this regard, as described above, the event detector 45 may be originally configured to invoke an arch break upon detection of various events. The patch 63 may be configured to modify the event detector 45 such that it will detect occurrences of an event, referred to hereafter as the "trigger event," indicative of a possible imminent error due to the identified bug. For instance, in the example described above, an error may occur upon the execution of the n-th add instruction when the processor core 42 is operating within a certain range of operating points. In such an example, the event detector 45 may be configured by the patch 63 to determine when the execution unit 43 has executed n-1 consecutive add instructions and the next instruction to be consecutively executed is also an add instruction. In the current example, execution of this next add instruction may cause an error if the core 42 is operating within a certain range of operating points. Other types of trigger events may be indicative of the identified bug in other embodiments. As indicated above, detection of the trigger events may be based on an analysis of the types or sequences of instructions being executed by the execution unit 43.

Upon detection of the trigger event, the event detector 45 induces an arch break causing the execution unit 43 to stop normal execution. There are a variety of techniques that may be employed to perform an arch break such that the normal execution of instructions is temporarily halted. For example, the execution unit 43 may issue no operation (NOP) instructions to its one or more pipelines (not specifically shown) during an arch break so that the pipelines remain busy processing the NOP instructions. Various other techniques are possible depending on the particular design of the execution unit 43.

In response to the trigger event, the event detector 45 also transmits, to the operating system 33 (FIG. 1), a function call indicative of the detected trigger event. In response, the operating system 33 invokes the trap handler 35, which handles the detected trigger event so that this event does not result in an error. In particular, the trap handler 35 submits a request to the controller 52 to adjust the frequency and/or power of the processor core 42 to a specified operating point or range of operating points within the "safe operating range," as determined by the processor designer. In response to such request, the controller 52 adjusts the frequency of the clock signal from the clock 19 and/or the voltage of the power signal from the power source 17 so that the processor core 42 operates within the specified range of operating points. Once the processor core 42 is operating as specified, the processor core 42 ends the arch break, and the execution unit 43 resumes execution of instructions. Since the processor core 42 is now operating within the safe operating range, an error due to the detected trigger event is prevented.

There are various techniques that may be employed to cause the trap handler 35 to submit the appropriate request to the controller 52 for sufficiently adjusting the operating point of the processor core 42 to avoid potential errors. For example, the trap handler 35 may be configured to execute different sets of instructions for different types of traps. An instruction set for requesting an adjustment to the processor core's operating point, as described above, may be stored in memory 24 as instructions for handling a certain type of trap. In such an example, the event detector 45 can be configured by the patch 63 to utilize, in response to the detected trigger event, a function call indicating an occurrence of a trap of the type that causes the trap handler 35 to branch to the foregoing instruction set. Thus, in handling the detected trigger event, the trap handler 35 branches to the stored instruction set, which when executed, causes the executing processor to transmit the appropriate request to controller 52 for adjusting the operating point of the processor core 42.

If the appropriate instruction set for adjusting the operating point of the processor core 42 to avoid errors from an identified bug is not already stored in memory 24 when the patch 63 is downloaded, the appropriate instruction set can be included in or otherwise defined by the patch 63. In such a case, the instruction set can be stored in a location that is normally branched to by the trap handler 35 when handling the trap indicated by the function call that is to be transmitted by the event detector 45 in response to the trigger event. Exemplary techniques that can be used to update the trap handler 35 in a similar manner are generally described in U.S. Pat. No. 5,983,000, entitled "Apparatus for Patching a Control Program in a Processor," filed on Jun. 4, 1998, which is incorporated herein by reference. Various other methodologies for updating the trap handler 35 are also possible.

As indicated above, several components of the system 10, such as the patch 63 and trap handler 35, for example, may be implemented, at least partially, in software or firmware. When implemented in software or firmware, such components can be stored and transported on any computer-readable medium. For example, the patch 63, when implemented in software, can be stored on a conventional computer diskette or disc and downloaded to the memory 24 via the I/O interface 29. In another embodiment, the patch 63 may be transported over a network, such as the Internet, coupled to the I/O interface 29, and the patch 63 may be downloaded to the memory 24 from the I/O interface 29. Various other techniques for downloading the patch 63 and other possible software components in the system 10 are also possible.

To better illustrate the foregoing, an exemplary use of the patch 63 to prevent errors from an identified processor bug will be described hereinbelow.

In this regard, assume that it is determined by a processor designer that execution of seven consecutive add instructions by the execution unit 43 is likely to result in an error for the result of the seventh add instruction if the processor core 42 is operating at a temperature above a particular threshold, referred to herein as "T." Also assume that the trap handler 35 has an instruction for branching to, a particular memory address, referred to as the "address 0000," in random access memory (RAM) and that this instruction is executed when the trap handler 43 handles a particular type of trap, referred to herein as "trap A." During booting of the system 10, a branch to another memory location or any other type of instruction may be stored at address 0000. Also assume that the event detector 45, in response to a detection of an occurrence of trap A, is configured to induce an arch break and to submit, to operating system 33, a function call indicating that an occurrence of trap A has been detected.

Figure 3:
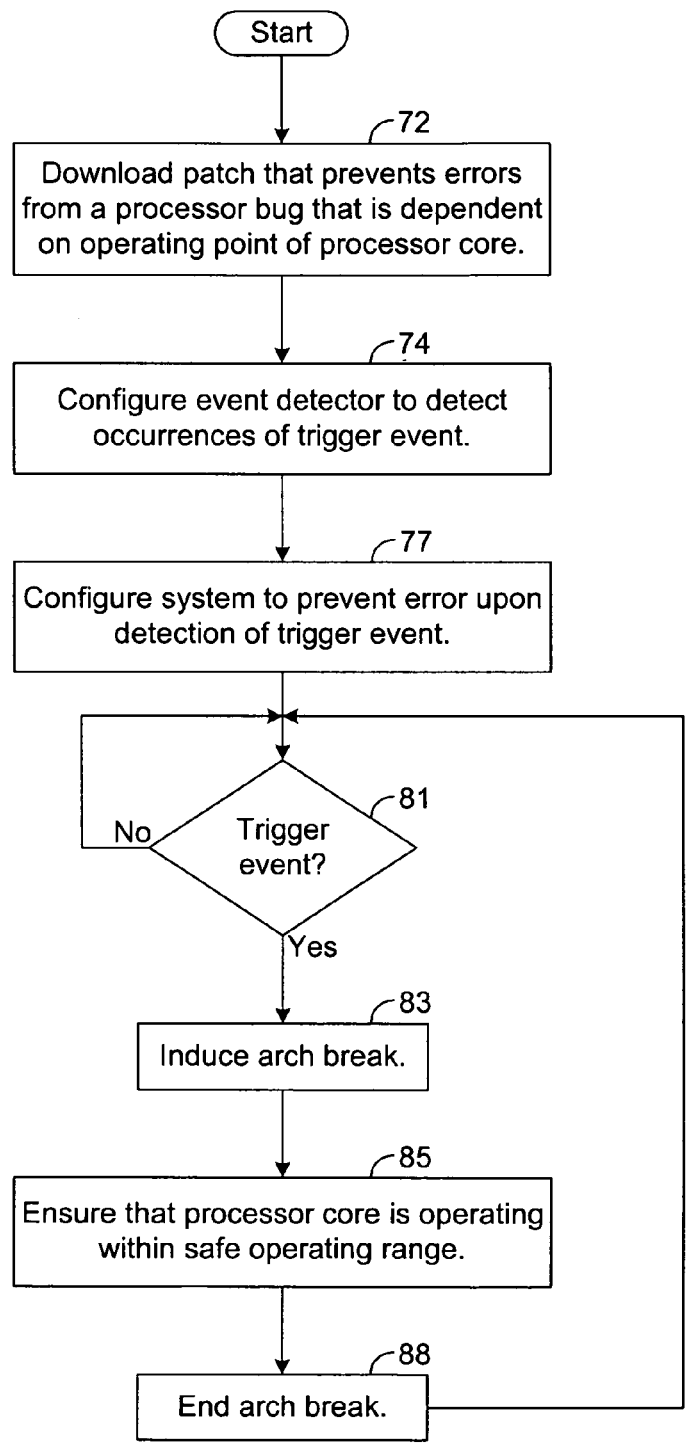
FIG. 3 is a flow chart illustrating an exemplary methodology for preventing errors in a processor, such as is depicted in FIG. 2.

Upon discovering the bug associated with the aforementioned error, the processor designer creates a patch 63 for preventing errors from the bug and downloads the patch 63 into memory 24, as shown by block 72 of FIG. 3. At system boot, the patch 63 is preferably executed causing the event detector 45 to be configured to detect occurrences of the trigger event, which is indicative of a possible imminent error due to the identified bug, as shown by block 74 of FIG. 3. In the instant example, execution of the patch 63 configures the event detector 45 to detect an occurrence of trap A when the event detector 45 determines that six consecutive add instructions have been or are to be executed by the execution unit 43 and that the next consecutive instruction to be executed by the execution unit 43 is also an add instruction. Note that, in this example, execution of the next consecutive add instruction (i.e., the seventh add instruction) may cause an error if the processor core 42 is operating above the temperature threshold, T.

In addition, execution of the patch 63 also configures the system 10 to prevent a possible error upon detection of the trigger event, as shown by block 77 of FIG. 3. In particular, upon execution, the patch 63 writes an instruction set at memory address 0000 in RAM. This instruction set, when executed, submits a request to controller 52 for causing the controller 52 to adjust the operating point of the processor core 42 such that the core's temperature is below at least the threshold, T.

After system boot, the execution unit 43 begins to execute instructions from a computer program 37. Assume that, at some point during such execution, the event detector 45 detects execution of six consecutive add instructions and that the next consecutive instruction (i.e., the seventh add instruction) is also an add instruction. In such an example, the event detector 45 detects an occurrence of the trigger event before execution of the seventh add instruction. In response, the event detector 45 induces an arch break, as shown by block 83 of FIG. 3, such that the execution unit 43 stops executing instructions from the computer program 37 before the seventh add instruction is executed. The event detector 45 also communicates, to the operating system 33, a function call indicating an occurrence of trap A. In response to the function call, the operating system 33 invokes the trap handler 35 and passes, to the trap handler 35, information indicative of a detected occurrence of trap A.

In handling the detected occurrence of trap A, the trap handler 35 branches to the set of instructions at memory address 0000. The set of instructions at memory address 0000 is then executed. In the example described hereafter, it will be assumed that the processor core 42 executes the instructions at address 0000, although it is possible for other components (not specifically) shown within the system 10 to execute such instructions in other embodiments.

Execution of the instructions at address 0000 causes the controller 52 to ensure that the processor core 42 is operating within the safe operating range, as shown by block 85 of FIG. 3. In the instant example, the controller 52 ensures that the temperature of the processor core 42 is below the threshold, T. In this regard, when executing the aforementioned instructions at memory address 0000, the processor core 42 submits a request, referred to hereafter as the "operating point change request," for requesting the core's temperature to be lowered to at least a specified temperature that is at or below the threshold, T. The request is buffered in register 54, which is read by the controller 52. In response, the controller 52 lowers the temperature of the core 42 if such temperature, as measured via the temperature sensing device 44, is higher than the temperature specified in the operating point change request.

In particular, if the temperature sensed by the temperature sensing device 44 is above the specified temperature, the controller 52 transmits control signals to the clock 19 and/or power source 17. Based on such control signals, the clock 19 lowers the frequency of the clock signal provided to the core 42, and/or the power source 17 lowers the voltage of the power signal provided to the core 42. Once the temperature sensed by the temperature sensing device 44 is below the specified temperature, the controller 52 transmits, to the register 55, a notification indicating that the operating point change request has been serviced. The processor core 42 reads the register 55 and, in response to such notification, continues executing the instructions for handling the detected trap.

Once the trap handler 35 has completed handling the detected trap, the trap handler 35 notifies the operating system 33, which then instructs the processor core 42 to end the arch break by resuming execution of the instructions from the computer program 37, as shown by block 88, FIG. 3. In response, the execution unit 43 executes the seventh add instruction. Since the seventh add instruction is executed after ensuring that the temperature of the processor core 42 is below the temperature threshold, T, the seventh add instruction should be executed without an error caused by the previously identified bug. Thus, a potential error from the previously identified bug is prevented.

It should be noted that the exemplary bug and exemplary techniques for remedying such bug described above are presented for illustrative purposes. It is possible for other bugs to be remedied via other techniques in other embodiments.

Now, therefore, the following is claimed:

1. A system for preventing processor errors, comprising:
    a processor core, the processor core configured to perform an architectural break in response to a detection of an event indicative of an imminent error in the processor core, the event being associated with a processing bug that effectuates the imminent error responsive to at least one predetermined operating point of the processor core; and
    a controller configured to adjust, in response to the detection, at least one of a clock signal and a power signal provided to the processor core during a time corresponding to the architectural break to prevent the processor core from exhibiting the at least one predetermined operating point such that the imminent error is prevented.

2. The system of claim 1, further comprising a temperature sensing device, wherein the controller is coupled to the temperature sensing device and is configured to adjust at least one of the clock signal and the power signal during the time corresponding to the architectural break based on a temperature sensed by the temperature sensing device.

3. The system of claim 1, wherein the processor core is configured to make the detection by analyzing code that is executed by the processor core.

4. The system of claim 2, further comprising a chip, wherein the processor core, the temperature sensing device, and the controller are integrated on the chip.

5. The system of claim 1, further comprising a trap handler invoked in response to the detection, the trap handler configured to transmit, to the controller during the time corresponding to the architectural break, a request for causing the controller to adjust the operating point of the processor core.

6. The system of claim 5, wherein the trap handler is configured to branch to a set of instructions defined by a patch.

7. The system of claim 1, further comprising a patch for configuring the processor core to detect occurrences of the event.

8. The system of claim 1, further comprising a patch for configuring, at system boot, the processor core to detect occurrences of the event.

9. A system for preventing processor errors, comprising:
    a processor core;
    a patch for configuring the processor core to detect occurrences of an event indicative of an imminent error in the processor core, the event being associated with a processing bug that effectuates the imminent error responsive to at least one predetermined operating point of the processor core; and
    a controller configured to adjust, in response to a detection of an occurrence of the event by the processor core, at least one of a clock signal and a power signal provided to the processor core to prevent the processor core from exhibiting the at least one predetermined operating point such that the imminent error is prevented.

10. The system of claim 9, further comprising a temperature sensing device, wherein the controller is coupled to the temperature sensing device and is configured to adjust at least one of the clock signal and the power signal based on a temperature sensed by the temperature sensing device.

11. The system of claim 9, wherein the processor core is configured to perform an architectural break in response to the detection of the occurrence.

12. The system of claim 9, wherein the detection is based on an analysis of instructions that are executed by the processor core.

13. A method for preventing processor errors, comprising:
    executing instructions from a computer program via a processor core;
    detecting an occurrence of an event indicative of an imminent error in the processor core, the event being associated with a processing bug that effectuates the imminent error responsive to at least one predetermined operating point of the processor core;
    interrupting the executing in response to the detecting; and
    adjusting, in response to the detecting, at least one of a clock signal and a power signal provided to the processor core to prevent the processor core from exhibiting the at least one predetermined operating point such that the imminent error is prevented.

14. The method of claim 13, further comprising sensing a temperature of the processor core, wherein the adjusting is based on the sensing.

15. The method of claim 13, further comprising analyzing code that is executed by the processor core, wherein the detecting is based on the analyzing.

16. The method of claim 13, wherein the processor resides within a computer system, and wherein the method further comprises:
    downloading a patch in the computer system; and
    configuring, via the patch, the processor core to perform the detecting.

17. A method for preventing processor errors, comprising:
    defining at least one condition indicative of an imminent error in a processor core, the at least one condition being associated with a processing bug that effectuates the imminent error responsive to at least one predetermined operating point of the processor core;
    downloading a patch in a computer system having the processor core;

configuring, via the patch, the processor core to detect when the at least one condition is present in the processor core; and adjusting, based on a sensed operating point of and in response to a detection of the at least one condition by the processor core, at least one of a clock signal and a power signal provided to the processor core such that an imminent error in the processor core is prevented.

18. The method of claim 17, further comprising sensing a temperature of the processor core, wherein the adjusting is based on the sensing.

19. The method of claim 17, further comprising analyzing code being that is executed by the processor core, wherein the detection is based on the analyzing.

20. The method of claim 17, further comprising initiating an architectural break for the processor core in response to the detection.

* * * * *